United States Patent [19]

Pons de Vinals

[11] Patent Number: 4,767,462
[45] Date of Patent: Aug. 30, 1988

[54] METHOD AND APPARATUS FOR COOLING AND FOR FURTHER TREATMENT OF HOT WHITE CEMENT CLINKER

[75] Inventor: Joaquin Pons de Vinals, Valencia, Spain

[73] Assignee: Cia. Valenciana de Cementos Portland S.A., Spain

[21] Appl. No.: 878,823

[22] Filed: Jun. 26, 1986

[30] Foreign Application Priority Data

Jun. 26, 1985 [DE] Fed. Rep. of Germany ....... 3522839

[51] Int. Cl.$^4$ ................................................. C04B 7/47
[52] U.S. Cl. .................................... 106/101; 106/100; 106/102; 432/77; 432/85
[58] Field of Search ................................ 106/100–102; 432/77, 85

[56] References Cited

U.S. PATENT DOCUMENTS

| 4,101,337 | 7/1928 | Dano .................................. | 106/102 |
| 4,573,908 | 3/1986 | Ichiyanagi et al. .................... | 432/85 |

FOREIGN PATENT DOCUMENTS

| 165034 | 12/1985 | European Pat. Off. ............ | 106/100 |
| 1942537 | 6/1970 | Fed. Rep. of Germany ...... | 106/100 |
| 52-27647 | 7/1977 | Japan ..................................... | 432/85 |

Primary Examiner—Steven Capella
Attorney, Agent, or Firm—Hill, Van Santen, Steadman & Simpson

[57] ABSTRACT

In the cooling and further treatment of hot white cement clinker wherein the cooling must be protected against exposure to oxygen so that it retains its white color, it is proposed in accordance with the invention that the hot white cement clinker departing the clinker calcining kiln be sprayed with water in an oxygen-free atmosphere and subsequently conducted in counter-current flow relative to a warm drying gas steam which is withdrawn together with the vapors picked up from the cement clinker, being withdrawn separated from the cooled, dried, white cement clinker. The manufacture of white cement clinker upon application of the clinker cooling and clinker drying of the invention requires a considerably lower overall thermal outlay than the manufacture of white cement clinker utilizing previously known clinker cooling methods employing a water bath. Moreover, the clinker quality is improved for the reason that the risk of the hydration of the white cement clinker is minimized by avoiding the cooling water bath.

11 Claims, 1 Drawing Sheet

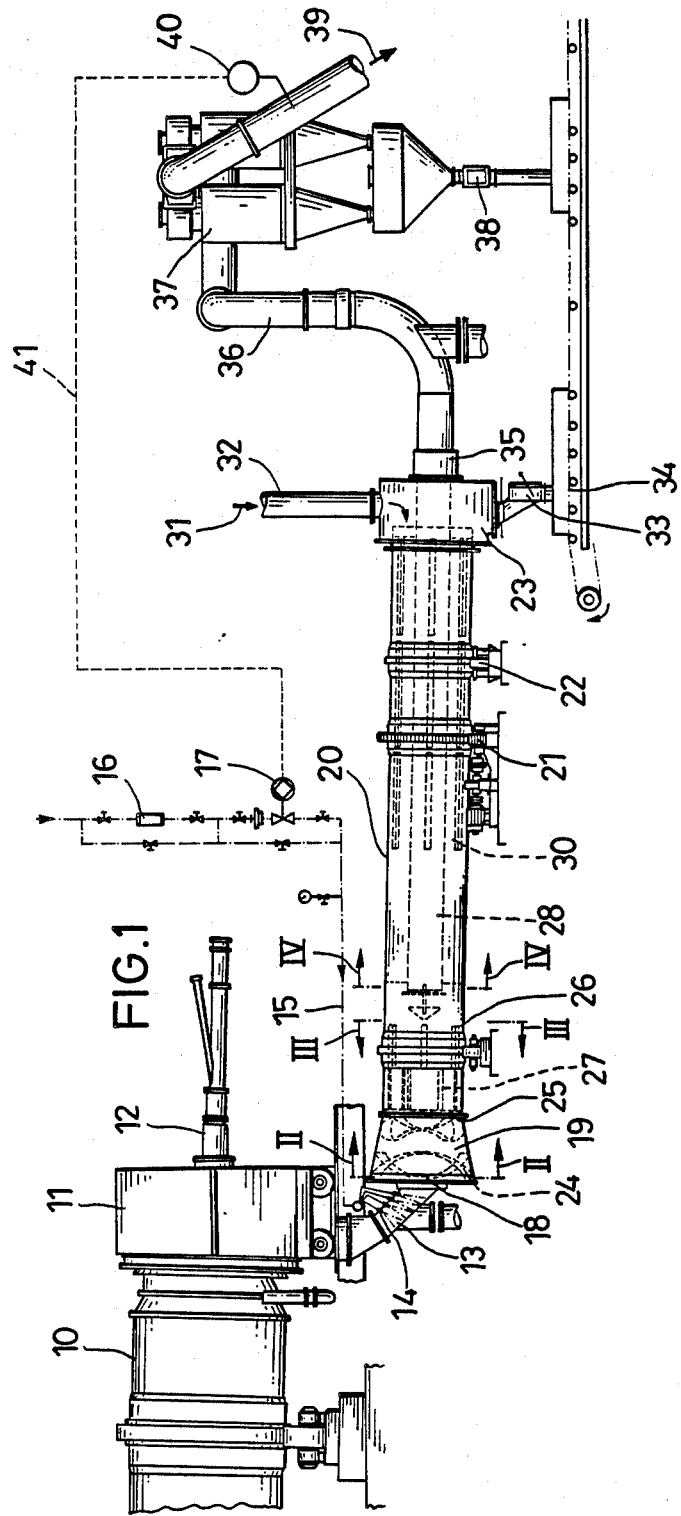

METHOD AND APPARATUS FOR COOLING AND FOR FURTHER TREATMENT OF HOT WHITE CEMENT CLINKER

BACKGROUND OF THE INVENTION

The invention relates to a method and apparatus for cooling and for further treatment of hot white cement clinker which is sprayed with water after leaving the clinker calcining kiln, whereupon the white cement clinker is dried under contact with a gas stream.

In all methods for the manufacture of cement clinker employing a rotary tubular kiln, the cement clinker has a temperature of nearly 1400° C. when it emerges from the rotary tubular kiln and must be cooled down to about 100° C. through 200° C. for further handling, and such cooling is normally undertaken with cold cooling air. However, in the manufacture of white cement clinker, air cannot be employed as coolant since the oxygen contained therein oxidizes the metallic components of the clinker. It is this oxidation state which produces the coloring of the cement clinker, for example gray coloring in various gradations, and the discoloration of the cement clinker depends on the quantity and the quality of the metallic components present in the clinker.

In order to protect against undesired oxidation phenomena, it is known to protect white cement clinker against exposure to oxygen when it is cooled (German Patent No. 25 44 343). For that purpose, the hot, sintered white cement clinker is first sprayed with a reduction agent such as, for example, oil when it departs the rotary tubular kiln and is subsequently cast into a water bath after it departs the rotary tubular kiln. This water bath is contained in cells of a rotating drum, and the white cement clinker quenched in the water bath is additionally sprayed with cooling water from above. As a consequence of the water bath cooling, the quenched white cement clinker has a water content of about 10% through 16%, or even higher when the clinker is fine-grained. This high water content leads to a reduction of the strength values of the cement manufactured of such white cement clinker, since a certain hydration is unavoidable, particularly when fine-grained clinker particles are present. In the known method, the quenched white cement clinker high in water content is dried with the assistance of a cooling air stream and with the expenditure of a relatively high thermal energy before the clinker can be ground. In this known method, moreover, the risk exists that a part of the water vapors generated from the cooling water will enter into the rotary tubular kiln and reduce the flame temperature and the sintering temperature therein. In the final analysis the energy balance is deteriorated, the energy requirement in the rotary tubular kiln is increased, the economic feasibility of the known method is diminished and, as a total consequence thereof, the final product, namely white cement, is made more expensive.

The object of the invention is to create a method and an apparatus for cooling and for further treatment of hot white cement clinker wherein the disadvantageous consequences of quenching the clinker in a water bath are avoided.

A further object is to avoid the deterioration of the performance capability of the clinker calcining kiln due to water vapor and to obtain further advantages.

Another object is that the white cement clinker treated in accordance with the invention should exhibit a high degree of whiteness and the cement manufactured therefrom should exhibit high strength values and should nonetheless be capable of being economically manufactured.

In the method of the invention, the white cement clinker is sprayed with water in an oxygen-free atmosphere and is subsequently conducted in counter-current flow relative to a warm drying gas stream which is withdrawn separately from the cooled, dried, white cement clinker, being withdrawn together with the vapors picked up from the cement clinker. The warm drying gas stream whose principal job is to carry out the vapors constantly developing from the sprayed hot clinker, can be highly enriched with water vapor up to the point it reaches the saturation limit. The hot cement clinker departing the clinker calcining kiln such as, for example, the rotary tubular kiln having a temperature of about 1400° C., is sprayed with such a great quantity of water in a pre-cooling stage such that the cement clinker is cooled shock-like to a temperature of about 500° C. through 800° C. but nonetheless exhibits a moisture content of only about 3% through 9% on a case-by-case basis. Subsequently, the cement clinker pretreated in this way is treated with the warm drying gas stream in a final cooling stage/drying zone, being treated in such fashion that the dry cement clinker departing this zone exhibits a temperature of about 60° C. through 100° C. as well as a residual moisture less than 0.5%. Due to the comparatively low moisture content of the cement clinker pretreated in the pre-cooling stage, about 3% through 9%, for example, about 6%, and due to the short path which the cement clinker traverses between the pre-cooling stage and the final cooling stage/drying zone, the risk of the undesired hydration of the clinker as well as the thermal outlay for drying the clinker are minimized. Thus, white cement clinker having high product quality can be manufactured with the method of the invention, and further can nonetheless be manufactured relatively economically.

In accordance with a special feature of the invention, the hot white cement clinker departing the clinker calcining kiln such as a rotary tubular kiln is circulated and mixed avoiding exposure to the outside atmosphere. It is circulated and mixed in the pre-cooling stage after the water spraying for the purpose of blending the clinker with itself and with the vapors as well as with water residue which may be present. The cooling water employed is distributed to all clinker particles with optimum uniformity and the residual heat remaining in the quenched clinker is as optimumly exploited as possible for the evaporation cooling and simultaneous drying of the clinker, this considerably promoting the economic feasibility of the method of the invention.

An apparatus of the invention for the implementation of the method is characterized by a rotary tube which is subdivided into a co-current flow pre-cooling stage with an admission opening for water-sprayed white cement clinker and into a following counter-current final cooling stage/drying stage with a discharge opening for cooled, dry clinker.

Other objects, advantages and features will become more apparent with the teaching of the principles of the invention in connection with the disclosure of the preferred embodiments in the specification, claims and drawings, in which:

DESCRIPTION OF THE DRAWINGS

FIG. 1 is a side elevational view illustrating an apparatus of the invention for cooling and for further treatment of hot white cement clinker;

FIG. 2 illustrates a section taken along the line II—II of FIG. 1;

FIG. 3 is a sectional view taken along line III—III of FIG. 1; and

FIG. 4 is a sectional view taken along line IV—IV of FIG. 1.

DESCRIPTION OF THE PREFERRED EMBODIMENTS

FIG. 1 illustrates the clinker discharge end of a rotary tubular kiln 10 for calcining white cement clinker which leaves the kiln via a non-co-rotating clinker outfall housing 11 at a temperature of about 1400° C., and falls in a downward direction. The rotary tubular kiln 10 has a burner lance 12.

The cement clinker drops down into a clinker conveying conduit 13 whose underside is fashioned as a chute inclined at an angle relative to the horizontal and whose upper side has water spraying nozzles 14 which are connected to a cooling water feed 15 in which a flow quantity measuring means 16 as well as a motor-driven control valve 17 are arranged.

The clinker which is cooled shock-like in oxygen-free atmosphere in the clinker conveying conduit 13 slides through a central, end-face opening 18, sliding into a housing 19. The housing is shaped like a truncated cone whose larger diameter lies at the clinker admission opening 18. A rotary tube 20 having rotary drive 21 and bearings 22 are connected to the smaller diameter thereof.

The rotary tube 20 is subdivided into a co-current flow pre-cooling stage comprising the admission opening 18 for the water-sprayed clinker and into a following, counter-current final cooling stage/drying zone comprising an outfall housing 23 for the cooled, dry clinker. The frustum-shaped co-current flow precooling stage 19 of the rotary tube 20 comprises built-in parts 24 (particularly seen in FIG. 2) such as helical agitators or the like for circulating and mixing the clinker with itself and with the vapors as well as with water residues which may potentially be present and which are not to be evaporated in the clinker conveying conduit 13. The quantity of water injected through the water spray nozzles 14, is so slight that no visible water bath is formed in the sump or, respectively, siphon at the left, lower end of the frustum-shaped housing 19. In the housing 19, superficially damp clinker pieces are intimately mixed with clinker pieces which potentially have not received adequate spray water in the conveying conduit 13 and are also intimately mixed with water residue which may have temporarily formed in the sump of the housing 19. Essentially no red-hot clinker pieces are present in the housing 19 but only clinker pieces which appear dark. This dark color is a defined quantity of clinker pieces which are dammed up by a retaining ring 25 which projects somewhat from the inside wall of the housing at the transition between the frustum-shaped housing 19 and the cylindrical part of the rotary tube 20. This may be particularly seen in FIG. 3. The retaining ring 25 not only keeps the clinker mass uniform but also dams up a water constituent that is excessive in quantitative terms and prevents it from entering into the final cooling stage/drying zone of the rotary tube 20. Due to the rapid development of vapor in the frustum-shaped housing 19, a slight over-pressure arises which minimizes the risk of leaked air entering at the seal where the clinker conveying conduit 13 and the central opening 18 of the frustum-shaped housing 19.

The quenched white cement clinker enters into a transition zone 26 with a temperature of about 650° C. through 750° C. and with a moisture content of less than 6% on a case-by-case basis, this transition zone 26 being arranged between the co-current flow pre-cooling stage and the counter-current final cooling stage/drying stage. The evaporation cooling of the cement clinker is stabilized in the transition zone 26 at whose inside wall paddle-like lifter elements 27 are arranged, as may be particularly seen in FIG. 3.

The pre-cooled cement clinker then enters into the counter-current final cooling stage/drying stage of the rotary tube 20 which is slightly downwardly inclined relative to the horizontal and is driven with a circumferential speed of, for example, 30 meters per minute.

Proceeding from the clinker outfall end 23, a concentrically arranged pipe 28 projects into the counter-current final cooling stage/drying zone of the rotary tube 20. As may particularly be seen in FIG. 4, the annular space between the jacket of the rotary tube and the co-rotating concentric inside tube 28 is subdivided into sectoral chambers 30 which may be equipped with lifter elements 29. The cooling clinker flows therein in the manner of a satellite cooler parallel to the rotational axis of the rotary tube 20 to the clinker outfall housing 23 in counter-current flow to a warm drying gas 31 which comes from an external hot air generator or from a heat transmission means (not shown). The air flows into the rotationally stationary clinker outfall housing 23 via conduit 32 having a temperature of 250° C. through 300° C. and is withdrawn charged with vapors after flowing through the sectoral chambers 30, being withdrawn via the concentric inside pipe 28.

The cooled and dried clinker emerges via the clinker outfall housing 23 and via a weight-loaded pendulum flap 33. The clinker has a temperature of about 60° C. through 100° C., for example 80° C., and has a residual moisture less than 0.5% and falls onto a belt conveyor 34. At 35 is a sealing gasket through which the rotating inside pipe 28 is connected to an offtake conduit 36 for withdrawing the drying gas. The gas contains vapor and dust, and is freed of clinker dust in a cyclone group 37. This clinker dust is delivered onto the belt conveyor 34 via a pendulum flap 38. The vapor-containing drying gas 39 freed of clinker dust departs the cyclone group 37 having a discharge temperature of about 160° C. at which the dew point has not yet been fallen below. This gas is extracted by an induced draft exhauster (not shown). The temperature of the exhaust gas 39 is identified by a measured temperature value generator 40 which is connected via a signal line 41 to the regulating valve 17, so that the quantity of water sprayed onto the hot cement clinker can be regulated dependent on the temperature of the drying gas stream 39 departing the final cooling stage/drying zone.

Experiences in testing the method of the invention as well as the apparatus of the invention have shown that the white cement clinker is autogenously comminuted on its path through the pre-cooling stage and the final cooling stage/drying zone. That is, the granulation of the white cement clinker transported out on the belt conveyor 34 is noticeably smaller than the granulation of the clinker which departs the rotary tubular kiln 10, clinker grinding energy thus being saved.

The thermal balance shows that the heat introduced into the system of the invention by the hot clinker is nearly sufficient in order to completely evaporate the cooling water. In order to prevent potential disruptions in the equilibrium of the method (clinker avalanches, irregularities in the operation of the clinker calcining kiln), it is nonetheless suitable in practical operation to work with a pre-heated drying air.

In comparison to the white cement clinker manufacture based on the previous water bath cooling method, the saving of specific overall heat consumption in the white cement clinker manufacture of the system of the invention amounts to more than 12% in any case.

Thus, it will be seen that there has been provided an improved method and apparatus for cooling and further treatment of hot white cement clinker which meets the objectives and advantages above set forth.

I claim as my invention:

1. An apparatus for the cooling and treatment of hot white cement clinker comprising in combination:
   a first chamber located to receive clinker discharged from a kiln with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   and means for delivering a drying air through the drying chamber to receive vapor picked up from the clinker,
   said first chamber being inclined downwardly for receiving and conveying the white clinker, and said water spray means being in the form of plural sprays at the upper portion of said first chamber.

2. An apparatus for the cooling and treatment of hot white cement clinker comprising in combination:
   a first chamber located to receive clinker discharged from a kiln with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   and means for delivering a drying air through the drying chamber to receive vapor picked up from the clinker,
   said drying chamber being formed by a rotatable tube with the first chamber delivering to an upstream end of the tube and the clinker being discharged from a downstream end of said tube.

3. An apparatus for the cooling and treatment of hot white cement clinker comprising in combination:
   a first chamber located to receive clinker discharged from a kiln with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   means for delivering a drying air through the drying chamber to receive vapor picked up from the clinker,
   and a second chamber being frusto-conical shaped with a large end positioned to receive clinker from the first chamber and a smaller end positioned to deliver clinker to said drying chamber.

4. An apparatus for the cooling and treatment of hot white cement clinker comprising in combination:
   a first chamber located to receive clinker discharged from a kilm with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   means for delivering a drying air through the drying chamber to receive vapor picked up from the clinker,
   the drying chamber being constructed as a rotationally driven tube;
   and an intermediate chamber between said first chamber and said drying chamber with the intermediate chamber being driven in rotation with the tube.

5. An apparatus for the cooling and treatment of hot white cement clinker constructed in accordance with claim 4:
   wherein said intermediate chamber includes a retaining ring projecting radially inwardly and retaining liquid within the intermediate chamber.

6. An apparatus for the cooling and treatment of hot white cement clinker comprising in combination:
   a first chamber located to receive clinker discharged from a kiln with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   and means for delivering a drying air through the drying chamber to receive vapor picked up from the clinker,
   the drying chamber being in the form of a rotary tube having lifting elements projecting inwardly for tumbling clinker therein.

7. An apparatus for the cooling and treatment of hot white cement clinker comprising in combination:
   a first chamber located to receive clinker discharged from a kiln with the chamber being closed to exclude air for the treatment of the clinker in an oxygen-free atmosphere;
   means for delivering water spray to the clinker in said chamber;
   a drying chamber connected to receive the clinker and through which the clinker is passed after the first chamber;
   means for delivering a drying air through the drying chamber to receive vapor picked up from the clinker,
   the drying chamber being in the form of a rotating tube having an upstream end for receiving clinker from the first chamber and a downstream end for delivering dried clicker and including a concentric pipe projecting from the downstream end into said tube for withdrawing drying air passing through the drying chamber.

8. An apparatus for the cooling and treatment of hot white cement clinker constructed in accordance with claim 7:
wherein the annular space between the tube and the pipe is divided into sections.

9. A method for the cooling and treatment of hot white cement clinker received from a calcining kiln comprising the steps:
passing hot white cement clinker through a first chamber from a kiln with the first chamber being closed to provide an oxygen-free atmosphere;
spraying a controlled quantity of water spray onto the clinker and providing a shock cooling of the clinker in the first chamber;
passing the clinker from the first chamber to a second chamber and tumbling the clinker in the second chamber to cause the clinker to mix, and to mix with water in the second chamber;
retaining surplus water within the second chamber;
passing the clinker from the second chamber to a drying chamber;
tumbling the clinker in the drying chamber;
passing a drying air over the clinker in the drying chamber in a direction counter to the movement of the clinker;
preheating the drying air;
and removing the drying air from the drying chamber.

10. A method for the cooling and treatment of hot white cement clinker received from a calcining kiln in accordance with the steps of claim 9:
including cleaning and removing particles of clinker from the drying air which is removed from the drying chamber.

11. A method for the cooling and treatment of hot white cement clinker received from a calcining kiln in accordance with the steps of claim 9:
including controlling the amount of water sprayed onto the clinker in the first chamber as a function of the temperature of the drying air removed from the drying chamber.

* * * * *